United States Patent
Niebling et al.

(10) Patent No.: US 8,052,537 B2
(45) Date of Patent: Nov. 8, 2011

(54) WHEEL HUB-JOINT UNIT

(75) Inventors: Peter Niebling, Bad Kissingen (DE); Ernst Masur, Untereuerheim (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 326 days.

(21) Appl. No.: 12/307,456

(22) PCT Filed: Jun. 28, 2007

(86) PCT No.: PCT/DE2007/001159
§ 371 (c)(1),
(2), (4) Date: Apr. 10, 2009

(87) PCT Pub. No.: WO2008/003293
PCT Pub. Date: Jan. 10, 2008

(65) Prior Publication Data
US 2009/0206649 A1 Aug. 20, 2009

(30) Foreign Application Priority Data
Jul. 4, 2006 (DE) .......................... 10 2006 030 682

(51) Int. Cl.
*F16D 3/223* (2006.01)
(52) U.S. Cl. ........................................ 464/178; 464/906

(58) Field of Classification Search ................. 464/178, 464/906; 384/544, 589
See application file for complete search history.

(56) References Cited

U.S. PATENT DOCUMENTS
7,850,530 B2 * 12/2010 Cermak .................. 464/178

FOREIGN PATENT DOCUMENTS
| DE | 19844115 | 4/1999 |
| DE | 102004054908 | 6/2004 |
| DE | 20320496 | 11/2004 |
| WO | 2006050785 | 5/2006 |

* cited by examiner

*Primary Examiner* — Gregory Binda
(74) *Attorney, Agent, or Firm* — Volpe and Koenig, P.C.

(57) ABSTRACT

A wheel hub-constant velocity joint unit in which a wheel hub (60, 90) with a passage opening (59, 89) that carries inner shaft teeth (44, 74) is tensioned with the outer joint part (46, 76) of a constant velocity joint (42, 72) on which a journal (53, 83) is formed with outer shaft teeth (54, 84), wherein inner shaft teeth (44, 74) of the passage opening (59, 89) and outer shaft teeth (54, 84) of the journal (53, 83) mesh in each other and a two-row wheel bearing (43, 73) is pushed onto the wheel hub (60, 90) that includes an inner bearing ring (64, 94) on which a front face (52, 82) of the outer joint part (46, 76) is supported directly, wherein the pitch circle diameter (TKD) of the roller bearing is greater than the pitch circle diameter (PCD) of the constant velocity joint.

21 Claims, 8 Drawing Sheets

(Prior Art)

WHEEL HUB-JOINT UNIT

BACKGROUND

The invention relates to a wheel hub-constant velocity joint unit in which a wheel hub with a passage opening that carries inner shaft teeth is held under tension with the outer joint part of a constant velocity joint on which a journal with outer shaft teeth is formed, wherein inner shaft teeth of the passage opening and outer shaft teeth of the journal mesh with each other and a double-row wheel bearing is pushed onto the wheel hub that comprises an inner bearing ring on which a front face of the outer joint part is directly supported. A screw that is supported on the outside on the wheel hub and that is screwed into a threaded hole in the journal is used for the tensioning. Arrangements of this type are used on drive wheels, in particular, the wheels used for steering motor vehicles, wherein the wheel and also, if necessary, a brake disk are screwed onto the flange of the wheel hub, while the constant velocity joint forms an integral component of a drive shaft (side shaft) that is made from an intermediate shaft, an inner sliding joint, and the constant velocity joint named here that can be constructed as a constant velocity joint (front-wheel drive) or also as a sliding joint (rear-wheel drive). The bearing arrangement is to be used in a wheel carrier or steering stub axle.

In known arrangements of the noted type, the design is directed toward dimensioning the wheel bearing as small as possible, both for reasons of cost with respect to the wheel bearing and also in terms of the overall size of the wheel carrier or steering stub axle. Under the mentioned point of view, the journal diameter on the outer joint part is designed for the minimum required strength, wherein the journal diameter simultaneously defines the inner diameter of the wheel hub and thus indirectly, via the strength-dependent wall thickness of the hub, the inner diameter of the wheel bearing. Due to the elasticity of the journal designed in this way, a change in torque, in particular, an abrupt change in torque guided through the arrangement leads to relative movements between the outer joint part and the inner ring of the wheel bearing on the mutual stop surfaces. This leads to noise being generated and also to sliding fit corrosion of the fitting and to the loss of the clamping force of the connection.

Starting from these conditions, the invention is based on the objective of providing a novel concept for a unit of the mentioned type that guarantees a higher bearing and connecting strength for a shorter construction and avoids the disadvantages named above.

This is achieved according to the invention by a wheel hub-constant velocity joint unit in which a wheel hub with a passage opening that carries inner shaft teeth is tensioned with the outer joint part of a constant velocity joint, wherein a journal with outer shaft teeth is formed on the constant velocity joint. Here, the inner shaft teeth of the passage opening and the outer shaft teeth of the journal engage one in the other and a double-row wheel bearing is pushed onto the wheel hub. The wheel hub comprises an inner bearing ring on which an end face of the outer joint part is directly supported. According to the invention, a pitch circle diameter of the roller bearing is greater than a pitch circle diameter of the constant velocity joint. In other words, a ratio of the pitch circle diameter of the roller bearing to the pitch circle diameter of the constant velocity joint is greater than 1.

Preferred embodiments and improvements are listed below.

The ratio of the pitch circle diameter of the roller bearing to the pitch circle diameter of the constant velocity joint is especially preferred from a range between 1, and 1.6, i.e., greater than 1, and less than 1.6.

Advantageously, the distance between the joint shaft center and the contact point of the wheel bearing is less than half the sum from the pitch circle diameter of the roller bearing and the ball diameter of the balls of the constant velocity joint (or the joint balls, also "ball joint").

Therefore, in this embodiment the distance of the joint and bearing in ratio to the appropriate pitch circle diameters is reduced in size. In this way, an increase in the tilting strength of the bearing and an increase in the bearing capacity and thus the bearing service life can be achieved.

In another preferred embodiment, a journal shaft of the joint shaft is less than the distance between the joint shaft center and the contact point of the wheel bearing or the ratio of the journal length of the joint shaft to the distance between the joint shaft center and the contact point or the contact plane of the wheel bearing is less than 1, i.e., $L_Z/B<1$.

In another preferred embodiment, the ratio between the bearing width and the distance between the joint center and the contact point is greater than 1, i.e., $B_L/B>1$.

SUMMARY

According to the present invention, another solution lies in a significantly shortened center distance of the joint and bearing at the ratio of given parameters for the bearing width and the joint diameter. According to the present invention, additional solutions lie in a qualitatively modified dimensioning of the journal that is represented significantly shorter and thicker. Here, the inner diameter of the wheel hub changes simultaneously and thus, indirectly, the inner diameter and the pitch circle diameter of the wheel bearing. Advantageous effects are a significant increase in the tilting strength of the bearing and an increase in the bearing capacity and thus the bearing service life.

The relative movements named above between the outer joint part and the inner ring of the wheel bearing are avoided or significantly reduced. The causes for this are, for one, the larger cross section of the journal and thus the larger torsional strength, for another, the larger effective radius of the active surface of the mutual support between the outer joint part and now the larger inner ring of the bearing.

The qualitatively modified dimensioning can be defined by different characteristic parameter ratios that differ qualitatively from previously used parameter ratios.

According to another preferred embodiment, it is set that half the sum from the pitch circle diameter PCD of the joint balls in the constant velocity joint, bearing width $B_L$, and ball diameter DW of the balls of the constant velocity joint or the joint balls is larger than the center distance $A_{GL}$ between the joint center $M_G$, of the constant velocity joint for an elongated joint and the geometric center $M_L$, of the wheel bearing.

According to another preferred configuration, it is provided that the ratio from the bearing width $B_L$, and journal diameter on the bearing base $D_Z$, is less than 1, i.e., $B_L/D_Z<1$.

Another preferred configuration provides that the ratio from the journal length $L_Z$, and pitch circle diameter of the bearing balls is less than 0.5, i.e., $L_Z/TKD<0.5$.

According to another preferred embodiment it is proposed that the ratio of the used teeth length $L_{VERZ}$, and pitch circle diameter of the bearing balls is less than 0.25, i.e., $L_{VERZ}/TKD<0.25$.

In addition, according to another embodiment it is provided that the ratio from the pitch circle diameter of the bearing balls and bearing width is greater than 1.9, i.e., $TKD/B_L>1.9$.

Finally, another embodiment distinguishes itself in that the cross-sectional surface $A_E$, of the wheel hub in the region of a separate bearing inner ring and square of the elongation length $L_{DEHN}$, of a screw for connecting the wheel hub and outer joint part is greater than 0.2, i.e., $A_E/L_{DEHN}^2 > 0.2$. Through this characteristic number, the stiffness in the tensioned volume of the wheel hub with the cross section $A_E$, can be indicated.

According to another preferred embodiment it is provided that the ratio from the center distance $A_{GL}$, between the constant velocity joint and the wheel bearing on one hand and the journal diameter on the journal base $D_Z$, on the other hand is less than 2, i.e., $A_{GL}/D_Z < 2$. Here, it is proposed, in particular, that the ratio from the center distance between the constant velocity joint and the wheel bearing on one hand and the journal diameter on the journal base $D_Z$, on the other hand is less than 1.5, i.e., $A_{GL}/D_Z < 1.5$, in particular, less than 1.2, i.e., $A_{GL}/D_Z < 1.2$. In this way, an especially torsion-resistant journal is achieved in construction, in order to minimize the relative movements between the bearing inner ring and the stop surface of the joint.

Another embodiment starts from the fact that the ratio from the pitch circle diameter of the wheel bearing TKD and the journal length $L_Z$, is greater than 2, i.e., $TKD/L_Z > 2$. Here it can be preferred that the ratio from the pitch circle diameter of the wheel bearing TKD and journal length $L_Z$, is greater than 2.25, i.e., $TKD/L_Z > 2.25$, in particular, greater than 2.85, i.e., $TKD/L_Z > 2.85$. Thus, a tilting strength of the wheel bearing is paired with the torsional strength of the journal, in order to minimize the generation of noise by the relative movements between the bearing inner ring and the joint stop surface and also the influence of deformations, in particular, the wheel hub, during operation.

Finally, according to another solution it is provided that the ratio from the center distance $A_{GL}$, between the constant velocity joint and the wheel bearing on one hand and the journal length $L_Z$, on the other hand is greater than 1.95, i.e., $A_{GL}/L_Z > 1.95$, wherein the ratio should be, in particular, greater than 2.0, i.e., $A_{GL}/L_Z > 2.0$.

With all of the definitions noted above, the known parameter ratios of units of the known type were abandoned and a unit with significantly improved properties is guaranteed. This is also clear with the characteristic number $D_Z^4$, of the moment of resistance that increases to greater than $2 \times 10^6$, $mm^4$, and the characteristic number $D_Z^4/L_Z$, of the moment of resistance related to the journal length that increases to greater than $10^6$, $mm^3$.

The solutions noted according to the invention can also be applied advantageously in combinations of several or all of the approaches with each other.

According to one preferred embodiment that applies for all of the solutions noted above, it is provided that the wheel bearing comprises only one separate bearing inner ring. According to another favorable improvement, it is provided that the wheel hub has a diameter reduction of the passage opening axially opposite the inner shaft teeth, in order to further increase the strength of the hub. It is further proposed that the journal has a central threaded borehole in which a screw is screwed for tensioning the wheel hub with the outer joint part. Finally, in a preferred manner it is to be provided that the screw head is supported in the region of the diameter reduction on a support surface of the wheel hub.

As already mentioned above, in all of the solutions noted above it is possible that the joint is a fixed joint, wherein the center of the joint is defined axially by the plane of the ball centers for an elongated joint. Alternatively, in all of the solutions it can be provided that the joint is a sliding joint, wherein the center of the joint is defined axially by the plane of the ball centers for an elongated joint set at the center of the axial displacement path.

BRIEF DESCRIPTION OF THE DRAWINGS

One preferred embodiment of a wheel hub-joint unit according to the invention is shown in the drawings and will be described below in comparison with a unit according to the state of the art.

DETAILED DESCRIPTION OF THE PREFERRED EMBODIMENTS

Figure 1A:
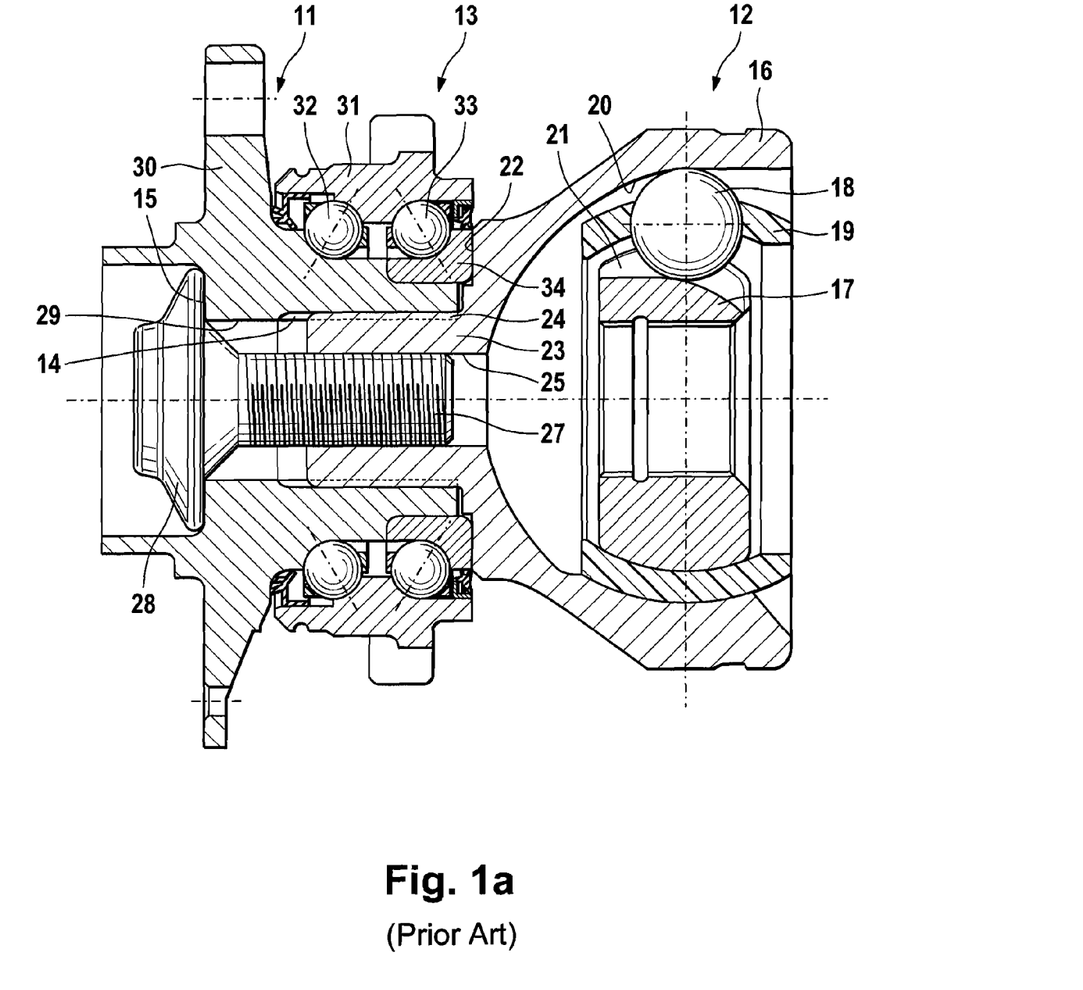
FIG. 1a, shows a longitudinal section view of a unit according to the state of the art with the specification of general reference symbols.
Figure 1B:
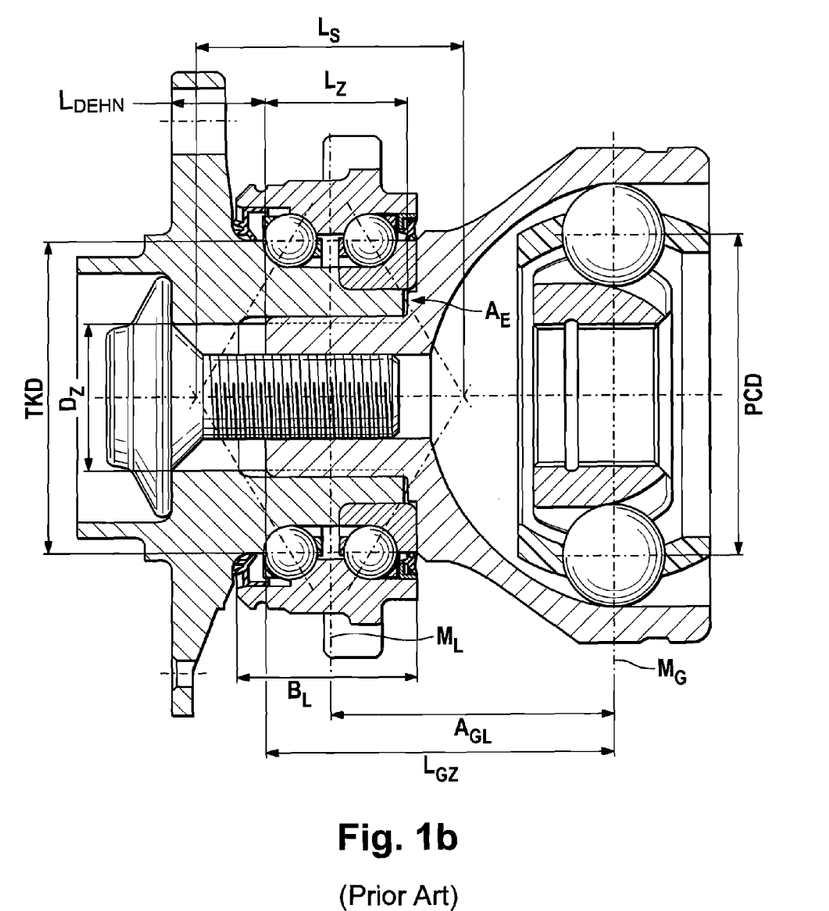
FIG. 1b, shows a view of the unit according to FIG. 1a with the specification of the parameters.

In FIGS. 1a, and 1b, a wheel hub unit 11 for a drive wheel of a motor vehicle is connected to a constant velocity joint (constant velocity fixed joint) 12 for connection to a drive shaft. The wheel hub unit 11 comprises a bearing unit 13 and a wheel hub 30, wherein the bearing unit 13 is drawn onto the wheel hub 30 and is axially tensioned between the wheel hub 30 and constant velocity joint 12. The wheel hub 30 comprises a flange for screwing onto a wheel on which a brake disk can also be screwed. The wheel hub 30 also has a passage opening 29 in which inner shaft teeth 14 are formed from the sides of the joint. On the flange there is a central, essentially axial support surface 15.

The constant velocity joint 12 is constructed according to a kind of UF joint and comprises an outer joint part 16, an inner joint part 17, torque-transmitting balls 18, and also a ball cage 19. The balls are held and guided in pairs from outer ball tracks 20 in the outer joint part and inner ball tracks 21 in the inner joint part.

On the outer joint part 16 there is, on the wheel hub side, an essentially axial support surface 22. Furthermore, a central journal 23 is set on the outer joint part that carries outer shaft teeth 24 that mesh in inner shaft teeth 14 of the hub. Furthermore, in the journal there is a continuous central threaded borehole 25 in which a screw 27 is screwed that is supported with its screw head 28 on the axial support surface 15 of the flange 12. The double-row bearing 13 comprises a bearing outer ring 31 that can be inserted into a wheel carrier and forms outer bearing grooves not designated in greater detail for two rows of bearing balls 32, 33. A first inner bearing groove for the ball row 32 is constructed directly in the wheel hub 30, while a second ball groove for the second ball row 33 is constructed in a separate bearing inner ring 34.

The bearing inner ring 34 transitions axially via the wheel hub 30, so that the bearing arrangement 13 can be tensioned under the effect of the support surface 22 on the outer joint part by the screw 27 supported on the support surface 15. The arrangement according to FIGS. 1a, and 1b, is designed to minimize the pitch circle diameter TKD of the wheel bearing. Here, the journal 23 is designed for its minimum strength and has a large journal length $L_Z$, for a relatively low journal diameter $D_Z$. In this way, the distance between the structural bearing center $M_L$, and the structural joint center $M_G$, increases. This distance is designated with $A_{GL}$. In the same way, the similarly designated distance from the joint center up to the journal end that is designated with $L_{GZ}$, and corresponds approximately to $A_{GL}+L_Z/2$. As another parameter, in FIG. 1a, the pitch circle diameter PCD of the joint is specified. Near this is also the support length $L_S$, of the bearing that has a so-called O configuration, wherein the effective lines of the balls lie on symmetric conical surfaces that open towards each other and also the bearing width $B_L$, of the bearing.

In FIGS. 2a, 2b, 3, and 4, a wheel hub unit 41 for a drive wheel of a motor vehicle is connected to a constant velocity joint 42 for connection to a drive shaft (not shown). The wheel hub unit 41 comprises a bearing unit 43 and a wheel hub 60, wherein the bearing unit 43 is drawn onto the wheel hub 60 and is tensioned axially between the wheel hub 60 and constant velocity joint 42. The wheel hub 60 comprises a flange for screwing on the wheel on which a brake disk can also be screwed. The wheel hub 60 further has a passage opening 59 in which inner shaft teeth 44 are formed from the sides of the joint. On the flange there is a central, essentially axial support surface 45. The constant velocity joint 42 is constructed as a UF joint and comprises an outer joint part 46, an inner joint part 47, torque-transmitting balls 48, and also a ball cage 49. The balls are held and guided in pairs made from outer ball tracks 50 in the outer joint part and inner ball tracks 51 in the inner joint part. On the outer joint part 46 there is an essentially axial support surface 52 on the wheel hub side. Furthermore, a central journal 53 is set on the outer joint part that carries outer shaft teeth 54 that mesh in the inner shaft teeth 44 of the hub. The outer joint part 46 and central journal 53 together form a joint shaft. Furthermore, in the journal a continuous central threaded borehole 55 is formed, in which a screw 57 is screwed that is supported with its screw head 58 on the axial support surface 45 of the wheel hub 60 (cf. FIG. 3). The support surface 45 is here constructed on a diameter reduction 56 of the passage opening 59. The two-row bearing 43 comprises a bearing outer ring 61 that can be inserted into a wheel carrier and forms outer bearing grooves not designated in greater detail for two rows of bearing balls 62, 63. A first inner bearing groove for the ball row 62 is constructed directly in the wheel hub 41, while a second ball groove is constructed for the second ball row 63 in a separate bearing inner ring 64. The bearing inner ring 64 transitions axially via the wheel hub 60, so that the bearing arrangement 43 can be tensioned under the effect of the support surface 52 on the outer joint part 46 by the screw 57 supported on the support surface 45.

Figure 2A:
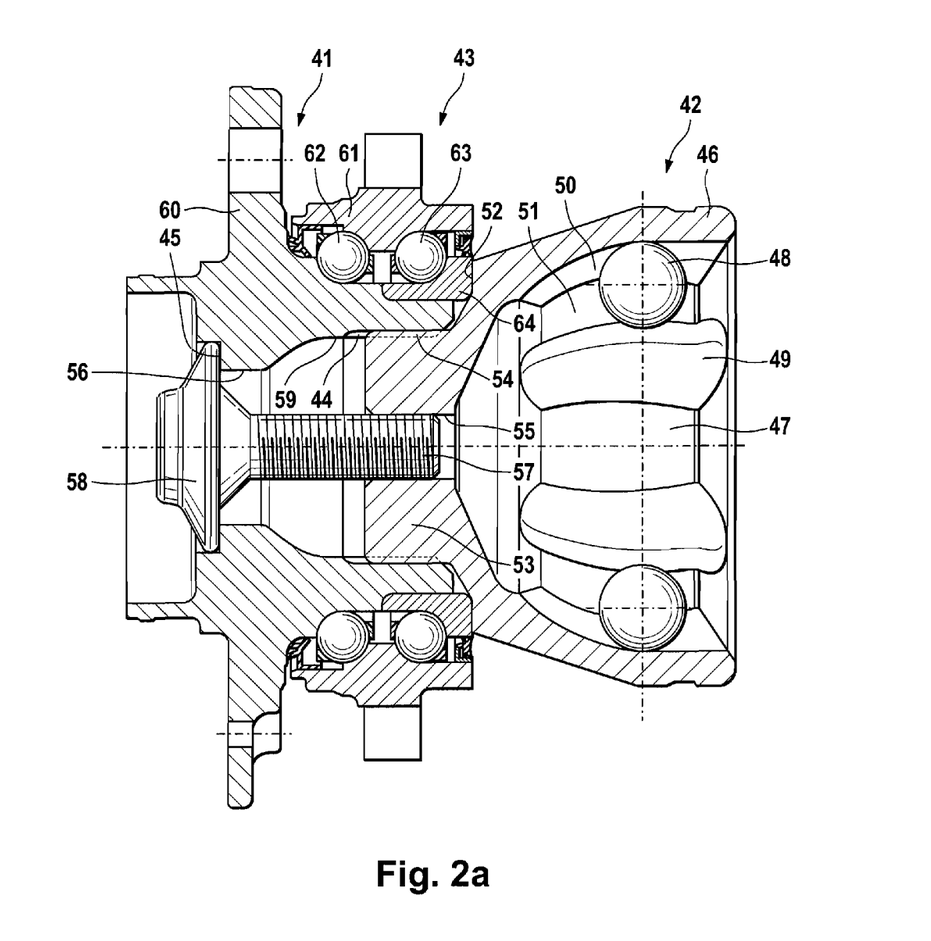
FIG. 2a, shows a view of a unit according to the invention with a constant velocity joint.
Figure 2B:
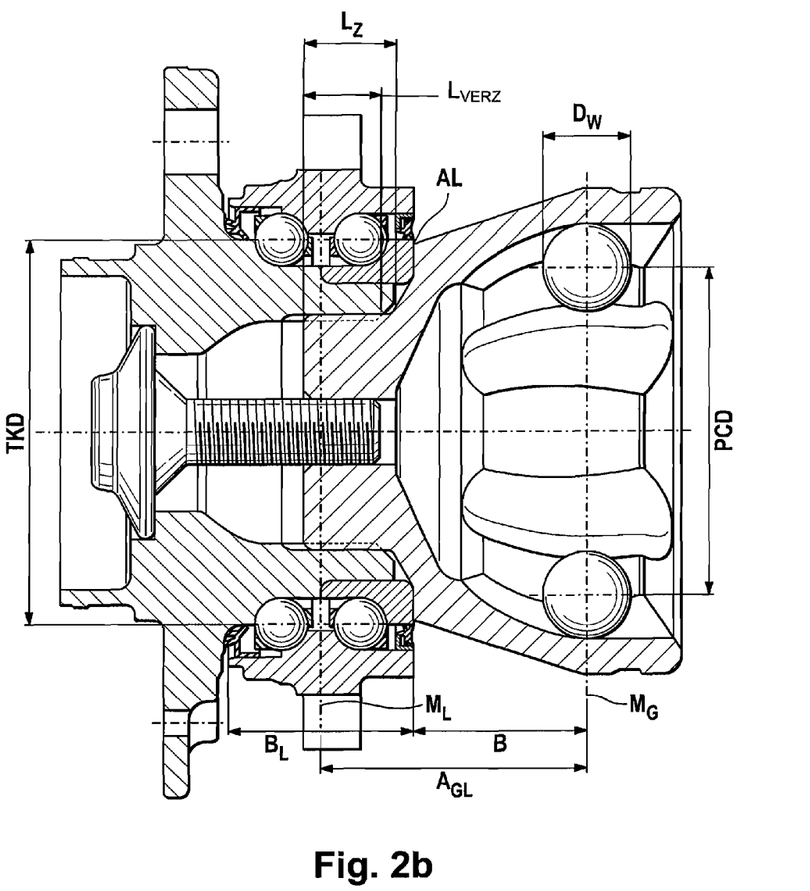
FIG. 2b, shows a view of the unit from FIG. 2a, with specification of the parameters.

FIG. 2b, shows the unit from FIG. 2a, wherein here the individual dimensions are designated. Here, the reference symbol TKD relates to the pitch circle diameter of the bearing arrangement. In the embodiment shown here, the two roller body rows 62, 63 have the same pitch circle diameter. The reference symbol PCD relates to the pitch circle diameter of the constant velocity joint. As is clear from FIG. 2a, the pitch circle diameter PCD of the constant velocity joint is less than the pitch circle diameter TKD of the roller bearing, so that the ratio between the pitch circle diameter PCD and the pitch circle diameter TKD is less than 1. The reference symbol $A_{GL}$, designates the distance between the bearing center and the joint center. Here, as a reference point for the bearing center, the geometric center between the two roller body rows 62 and 63 was used and for the joint center, the center point or the center plane of the individual balls 48 was used. The reference symbol B designates the distance between the joint shaft center $M_G$, and the contact point or contact plane of the wheel bearing. As discussed above, this distance is less than half the sum from the pitch circle diameter TKD of the roller bearing and the pitch circle diameter PCD of the constant velocity joint and thus less than the arithmetic mean between the two pitch circle diameters.

The reference symbol $L_Z$ designates the journal length of the journal of the joint shaft. This is less than the distance B between the joint shaft center $M_G$ and the contact point AL of the wheel bearing, as similarly given from FIGS. 2a, 2b.

Finally, as similarly given from FIG. 2b, the ratio between the bearing width $B_L$, under the distance B is greater than 1, or, in other words, the bearing width BL is greater than the distance between the joint shaft center $M_G$, and the contact point AL of the wheel bearing. The reference symbol DW designates the diameter of the balls 48.

Figure 3:
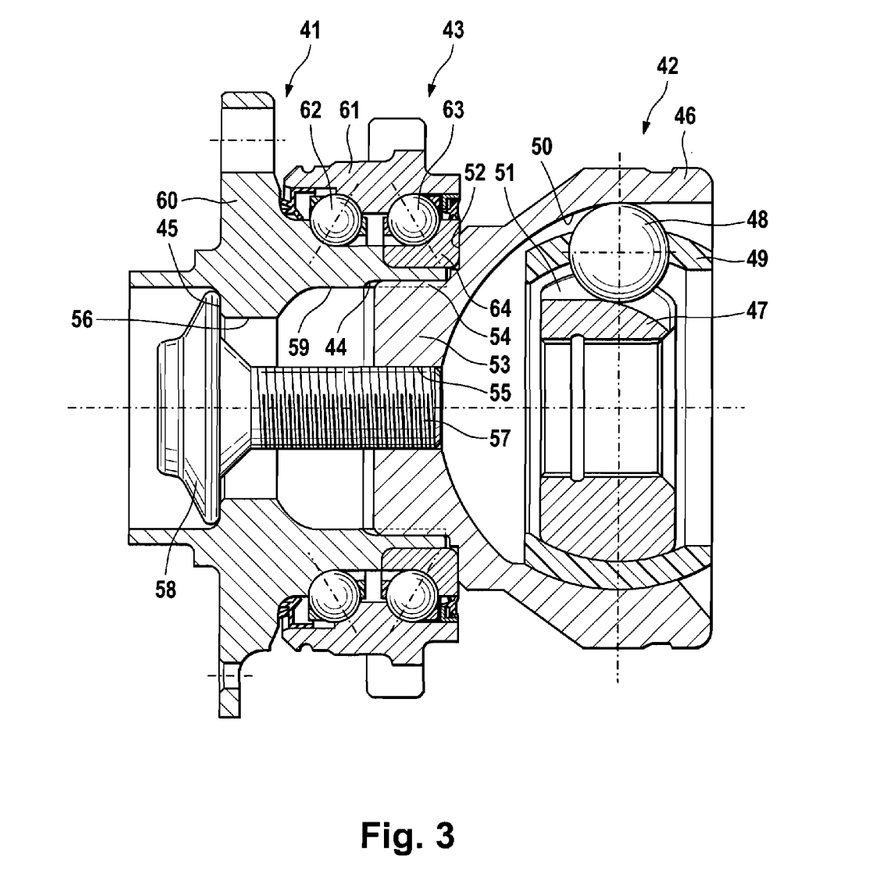
FIG. 3 shows a view of a unit according to the invention with a constant velocity joint with specification of general reference symbols.
Figure 4:
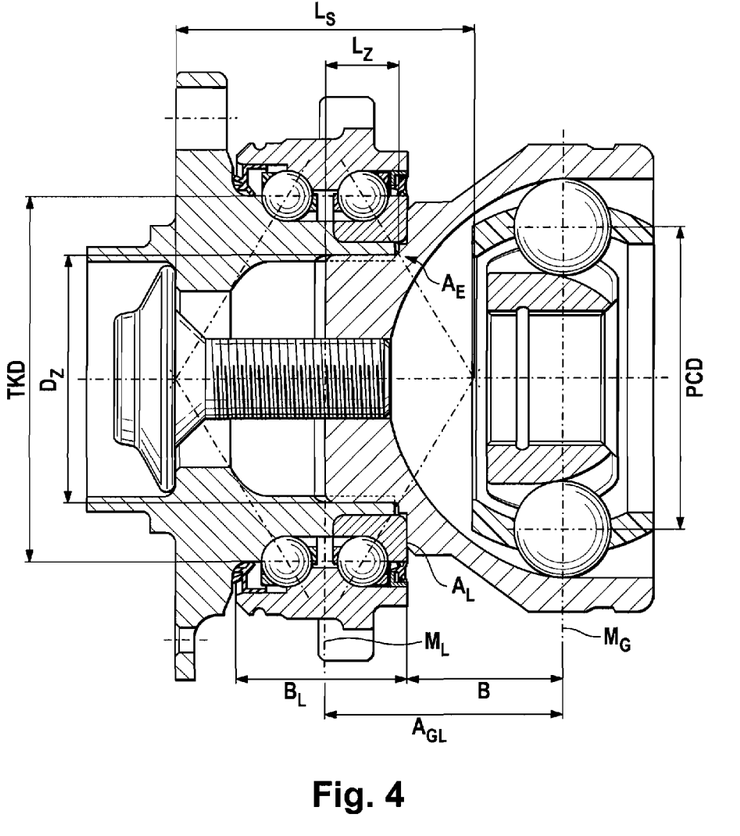
FIG. 4 shows a view of the unit according to FIG. 3 with specification of the parameters.

In a joint according to the invention of the type shown in FIGS. 3 and 4, a qualitatively larger pitch circle diameter TKD of the bearing arrangement is permitted, because for clear reduction of the distance $A_G L$ between the bearing center $M_L$ and the joint shaft center $M_G$, a clear qualitative growth of the journal diameter $D_z$, has been performed. This growth in the journal diameter $D_Z$ permits a shortening of the journal length $L_z$. In FIG. 4, the pitch circle diameter PCD of the joint, the bearing width $B_L$, and also the support length Ls of the bearing arrangement are also shown as additional parameters that were referenced in the description or in the claims. Likewise, the elongation length $L_{DEHN}$ of the screw and the annular cross-sectional area $A_E$, of the wheel hub under the separate bearing inner ring are designated. Also here, the bearing has an 0 configuration with effective lines of the balls that lie on open conical surfaces that are symmetric to each other.

In comparison with an arrangement according to FIGS. 1a, and 1b, in which the journal is minimized in diameter and is here relatively non-resistant to torsion, the arrangement according to the invention according to FIGS. 2a, 2b, 3, and 4 exhibits a short, thick, and thus torsion-resistant journal. The micro-movements occurring due to alternating torque between the support surface on the outer joint part and the corresponding counter surface on the separate bearing inner ring no longer appear in the joint according to the invention.

Figure 5:
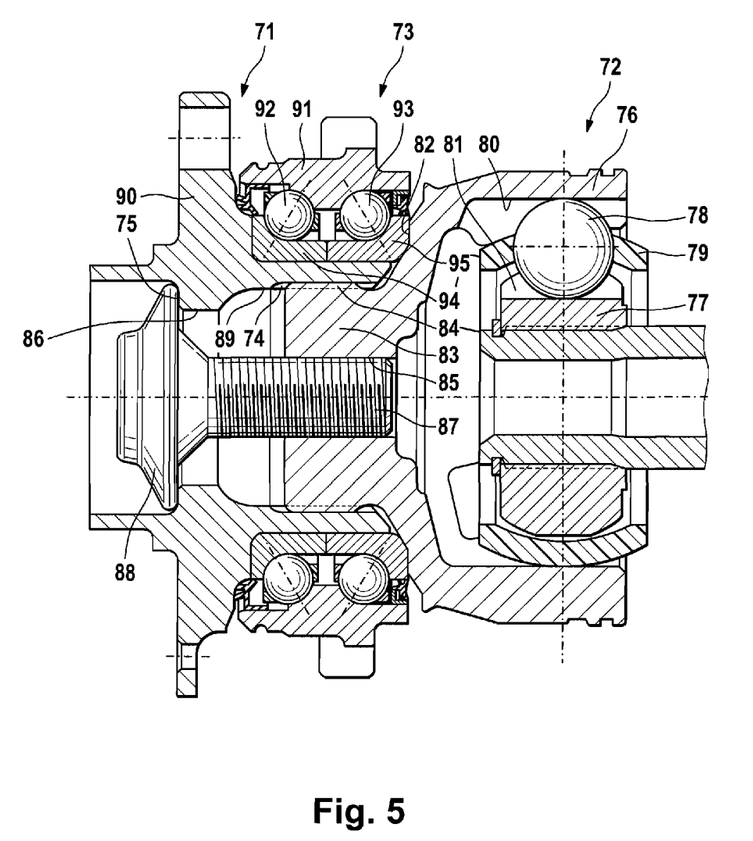
FIG. 5 shows a view of a unit according to the invention with a constant velocity sliding joint with specification of general reference symbols.
Figure 6:
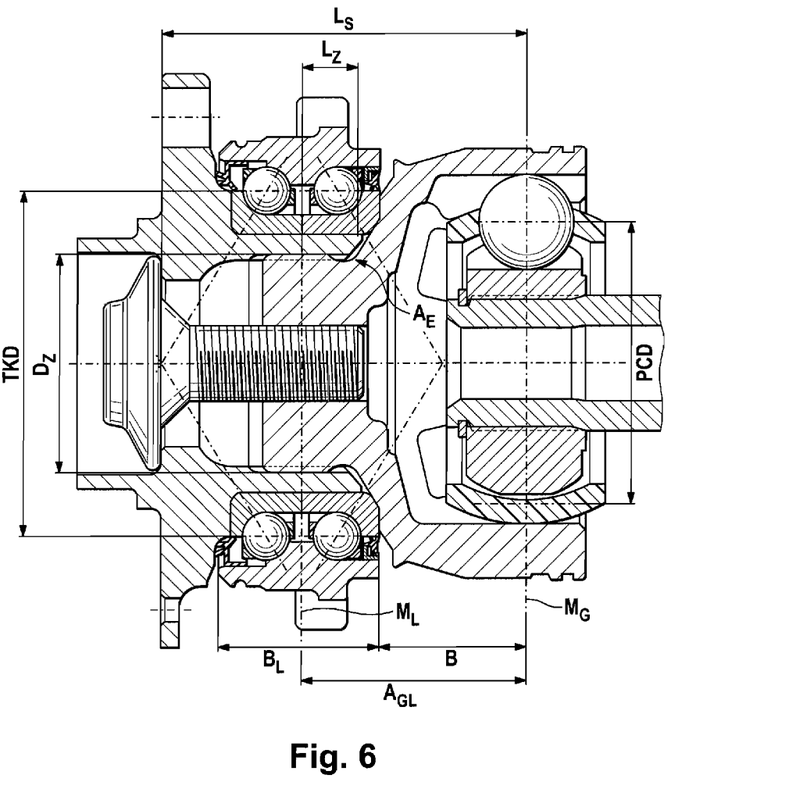
FIG. 6 shows a view of the unit according to FIG. 5 with specification of the parameters.

In FIGS. 5 and 6, a wheel hub unit 71 for a drive wheel of a motor vehicle is connected to a constant velocity sliding joint 72 for connecting to a drive shaft, wherein a bearing unit 73 is drawn onto the wheel hub unit 71 and is tensioned axially between the wheel hub unit 71 and the constant velocity sliding joint 72. The wheel hub 90 comprises a flange for screwing onto a wheel on which a brake disk can also be screwed. The wheel hub 90 further has a passage opening 89 in which inner shaft teeth 74 are formed from the sides of the joint. On the flange, a central, essentially axial support surface 75 is formed.

The constant velocity sliding joint 72 is formed as a VL joint and comprises an outer joint part 76, an inner joint part 77, torque-transmitting balls 78, and also a ball cage 79. The balls are held and guided in pairs from outer ball tracks 80 in the outer joint part and inner ball tracks 81 in the inner joint part. On the outer joint part 76, on the wheel hub side there is an essentially axial support surface 82. Furthermore, a central journal 83 is set on the outer joint part that carries outer shaft teeth 84 that mesh in the inner shaft teeth 74 of the hub.

Furthermore, in the journal a continuous central threaded borehole 85 is formed in which a screw 87 is screwed that is supported with its screw head 88 on the axial support surface 75 of the wheel hub 90. The support surface 75 is here formed on a diameter reduction 86 of the passage opening 89.

The double-row bearing 73 comprises a bearing outer ring 91 that can be inserted into a wheel carrier and outer bearing grooves not designated in greater detail for two rows of bearing balls 92, 93. A first inner bearing groove for the ball row 62 is formed in a bearing inner ring 94, while a second ball groove for the second ball row 63 is formed in a bearing inner ring 95. The bearing inner ring 94 transitions axially via the wheel hub 90, so that the bearing arrangement 73 can be tensioned under the effect of the support surface 82 on the outer joint part by the screw 87 supported on the support surface 75.

In FIG. 6, the dimensions of the wheel hub unit are similarly shown. Here it is also to be seen that the pitch circle diameter TKD is greater than the pitch circle diameter PCD of the constant velocity sliding joint. Also, the other ratios of the dimensions can be applied here accordingly, i.e., the distance B between the joint shaft center $M_G$, and the contact point AL of the bearing is less than half the sum from the pitch circle diameters TKD and PCD. Also the journal length $L_Z$, of the joint shaft is here less than the distance B between the joint shaft center $M_G$, and the contact point AL of the wheel bearing. In addition, the ratio between the bearing width $B_L$, and the distance B is also greater than 1.

In the joint according to the invention of the type shown in FIGS. 5 and 6, a qualitatively larger pitch circle diameter TKD of the bearing arrangement is permitted, because for clear reduction of the distance $A_{GL}$, between the bearing center $M_L$, and the joint center $M_G$, a clearly qualitative growth of the journal diameter $D_Z$, has been performed. This growth in the journal diameter $D_Z$, permits shortening of the journal length $L_Z$.

As stated, the pitch circle diameter PCD of the joint, the bearing width $B_L$, and also the support length $L_S$, of the bearing arrangement are also shown in FIG. 6 as additional parameters that were referenced in the description or in the claims. Similarly, the elongation length $L_{DEHN}$, of the screw and the annular cross-sectional surface $A_E$, of the wheel hub are designated under the separate bearing inner ring. The joint center $M_G$, lies centrally between the half displacement paths $V_S/2$, marked out to both sides. Also here the bearing has an O configuration with active lines of the balls lying on open conical surfaces symmetric to each other.

In comparison with an arrangement according to FIGS. 1 and 2 in which the journal is minimized in diameter and is here relatively non-resistant to torsion, the arrangement according to the invention according to FIGS. 5 and 6 shows a short, thick, and thus torsion-resistant journal. The micro-movements occurring under alternating torque between the support surface on the outer joint part and the corresponding counter surface on the separate bearing inner ring no longer appear in the joint according to the invention.

In a preferred embodiment, a ratio of the pitch circle diameter TKD of the roller bearing to the pitch circle diameter PCD of the constant-velocity joint is in a range between 1, and 1.6.

In a preferred embodiment, a distance B between a center MG of a joint shaft and a contact point AL of the wheel bearing to a shoulder of the joint shaft is smaller than half of a sum of the pitch circle diameter TKD of the roller bearing and a ball diameter DW of balls of the constant velocity joint according to B <(TKD+DW)/2.

In a preferred embodiment, half of a sum of the pitch circle diameter PCD, a bearing width BL, and a ball diameter of balls of the constant velocity joint is greater than a center distance AGL defined axially between a center of the balls of the constant velocity joint and a center the wheel bearing according to (PCD+BL +DW)/2>, AGL.

In a preferred embodiment, a ratio of a bearing width BL and a journal diameter at a bearing base $D_Z$, is less than 1. It is further preferred that a ratio of a journal length $L_Z$, and the pitch circle diameter TKD is less than 0.5. Additionally, it is preferred that a ratio of an applied teeth length LVERZ and the pitch circle diameter TKD is less than 0.25. Additionally, it is preferred that a ratio of the pitch circle diameter TKD and a bearing width BL is greater than 1.9.

In a preferred embodiment, a ratio of a cross-sectional area AE of the wheel hub in a region of a separate bearing inner ring and a square of an elongation length LDEHN of a screw for connection of the wheel hub and the outer joint part is greater than 0.2.

In a preferred embodiment, a ratio of a center distance AGL between the constant velocity joint and the wheel bearing and the journal diameter on the journal base DZ is less than 2. It is further preferred that a ratio of a center distance AGL between the constant velocity joint and the wheel bearing and a journal diameter at a journal base DZ is less than 1.5.

In a preferred embodiment, a ratio of the pitch circle diameter of the wheel bearing TKD and a journal length LZ is greater than 2. It is further preferred that a ratio of the pitch circle diameter of the wheel bearing TKD and a journal length LZ is greater than 2.25.

In a preferred embodiment, a ratio of a center distance AGL between the constant velocity joint and the wheel bearing and a journal length LZ is greater than 1.95.

The joint can be a fixed joint, and a center of the joint MG is defined axially by a plane defined by centers of the balls of the constant velocity joint for an elongated joint. Alternatively, the joint can be a sliding joint, wherein a center of the joint MG is defined axially by a plane defined by centers of the balls of the constant velocity joint for an elongated joint set on a center of an axial displacement path VS.

All of the features disclosed in the application documents are claimed as essential to the invention, as far as they are novel individually or in combination relative to the state of the art.

LIST OF REFERENCE SYMBOLS 11, 41, 71 Wheel-hub unit
12, 42, 72 Constant-velocity joint
13, 43, 73 Wheel bearing
14, 44, 74 Inner shaft teeth
15, 45, 75 Support surface (wheel hub)
16, 46, 76 Outer joint part
17, 47, 77 Inner joint part
18, 48, 78 Ball
19, 49, 79 Ball cage
20, 50, 80 Ball track, outside
21, 51, 81 Ball track, inside
22, 52, 82 Support surface (outer joint part)
23, 53, 83 Journal
24, 54, 84 Outer shaft teeth
25, 55, 85 Threaded borehole
56, 86 Diameter reduction
27, 57, 87 Screw
28, 58, 88 Screw head
29, 59, 89 Passage opening
30, 60, 90 Wheel hub 31, 61, 91 Outer bearing ring
32, 62, 92 Ball row
33, 63, 93 Ball row
34, 64, 94 Inner bearing ring
95 Inner bearing ring
TKD Pitch circle diameter, bearing
$D_Z$, Journal diameter
$L_Z$, Journal length
$M_L$, Bearing center
$M_G$, Joint center
$A_{GL}$, Distance bearing center-joint center
$L_{GZ}$, Distance joint center-journal end
PCD Pitch circle diameter, joint
$L_S$, Support length, bearing
$V_S$, Displacement path
$A_E$, Cross-sectional area, wheel hub
$L_{DEHN}$, Elongation length, screw shaft
AL Contact point of wheel bearing
B Distance between joint shaft center and contact point AL
$B_L$, Bearing width
DW Diameter of balls of the constant-velocity joint or joint ball or "ball joint"

The invention claimed is:

1. Wheel hub-constant velocity joint unit comprising
a wheel hub with a passage opening that carries inner shaft teeth,
an outer joint part of a constant velocity joint on which a journal is formed with outer shaft teeth, the wheel hub is tensioned with the outer joint part,
the inner shaft teeth of the passage opening and the outer shaft teeth of the journal mesh with each other,
a double-row wheel bearing is pushed onto the wheel hub that comprises an inner bearing ring on which an end face of the outer joint part is supported directly,
a pitch circle diameter TKD of the roller bearing is greater than a pitch circle diameter PCD defined by balls of the constant velocity joint, and
a ratio of an applied teeth length LVERZ and the pitch circle diameter TKD is less than 0.25.

2. Unit according to claim 1, wherein a ratio of the pitch circle diameter TKD of the roller bearing to the pitch circle diameter PCD of the constant-velocity joint is in a range between 1 and 1.6.

3. Unit according to claim 1, wherein a distance B between a center MG of a joint shaft and a contact point AL of the wheel bearing to a shoulder of the joint shaft is smaller than half of a sum of the pitch circle diameter TKD of the roller bearing and a ball diameter DW of the balls of the constant velocity joint according to B<(TKD+DW)/2.

4. Unit according to claim 3, wherein a journal length $L_Z$ of a journal of the joint shaft is less than a distance B between the joint shaft center $M_G$ and the contact point AL of the wheel bearing.

5. Unit according to claim 4, wherein a ratio between a bearing width BL and the distance B between the joint shaft center $M_G$ and the contact point AL of the wheel bearing is greater than 1.

6. Unit according to claim 1, wherein half of a sum of the pitch circle diameter PCD, a bearing width BL, and a ball diameter of the balls of the constant velocity joint is greater than a center distance AGL defined axially between a center of the balls of the constant velocity joint and a center the wheel bearing according to (PCD+BL+DW)/2>AGL.

7. Unit according to claim 1, wherein a ratio of a bearing width BL and a journal diameter at a bearing base Dz is less than 1.

8. Unit according to claim 1, wherein a ratio of a journal length Lz and the pitch circle diameter TKD is less than 0.5.

9. Unit according to claim 1, wherein a ratio of the pitch circle diameter TKD and a bearing width BL is greater than 1.9.

10. Unit according to claim 1, wherein a ratio of a cross-sectional area AE of the wheel hub in a region of a separate bearing inner ring and a square of an elongation length LDEHN of a screw for connection of the wheel hub and the outer joint part is greater than 0.2.

11. Unit according to claim 1, wherein a ratio of a center distance AGL defined axially between a center of the balls of the constant velocity joint and a center the wheel bearing and a journal diameter on the journal base DZ is less than 2.

12. Unit according to claim 11, wherein a ratio of the center distance AGL between the constant velocity joint and the wheel bearing and the journal diameter at a journal base DZ is less than 1.5.

13. Unit according to claim 12, wherein a ratio of the pitch circle diameter of the wheel bearing TKD and a journal length LZ is greater than 2.25.

14. Unit according to claim 1, wherein a ratio of the pitch circle diameter of the wheel bearing TKD and a journal length LZ is greater than 2.

15. Unit according to claim 1, wherein a ratio of a center distance AGL between the constant velocity joint and the wheel bearing and a journal length LZ is greater than 1.95.

16. Unit according to claim 1, wherein a ratio of a center distance AGL between the constant velocity joint and the wheel bearing and a journal length LZ is greater than 2.0.

17. Unit according to claim 1, wherein the wheel hub has a diameter reduction of the passage opening axially opposite the inner shaft teeth.

18. Unit according to claim 17, wherein the journal has a central threaded borehole in which a screw is screwed for tensioning the wheel hub with the outer joint part.

19. Unit according to claim 18, wherein a screw head of the screw is supported in a region of the diameter reduction on a support surface of the wheel hub.

20. Unit according to claim 1, wherein the joint is a fixed joint, wherein a center of the joint MG is defined axially by a plane defined by centers of the balls of the constant velocity joint for an elongated joint.

21. Unit according to claim 1, wherein the joint is a sliding joint, wherein a center of the joint MG is defined axially by a plane defined by centers of the balls of the constant velocity joint for an elongated joint set on a center of an axial displacement path VS.

* * * * *